Figure 1:
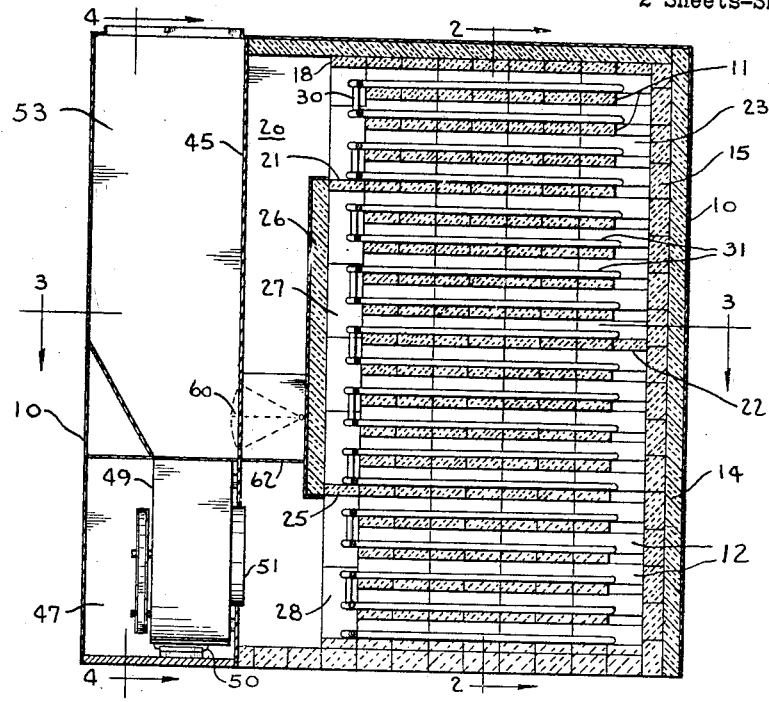

Jan. 11, 1949.　　　　Y. R. CORNELIUS　　　　2,458,835
HEATING APPARATUS

Filed May 29, 1945　　　　　　　　　　　　2 Sheets-Sheet 1

YNGVE R. CORNELIUS
　　INVENTOR.

BY
　　ATTORNEY

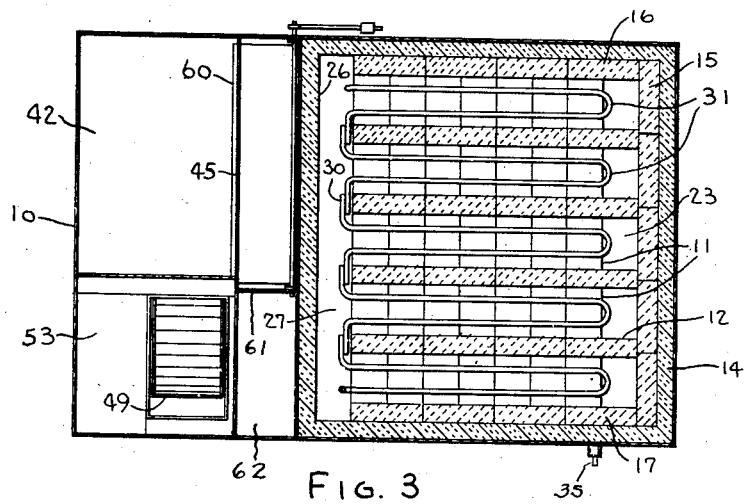
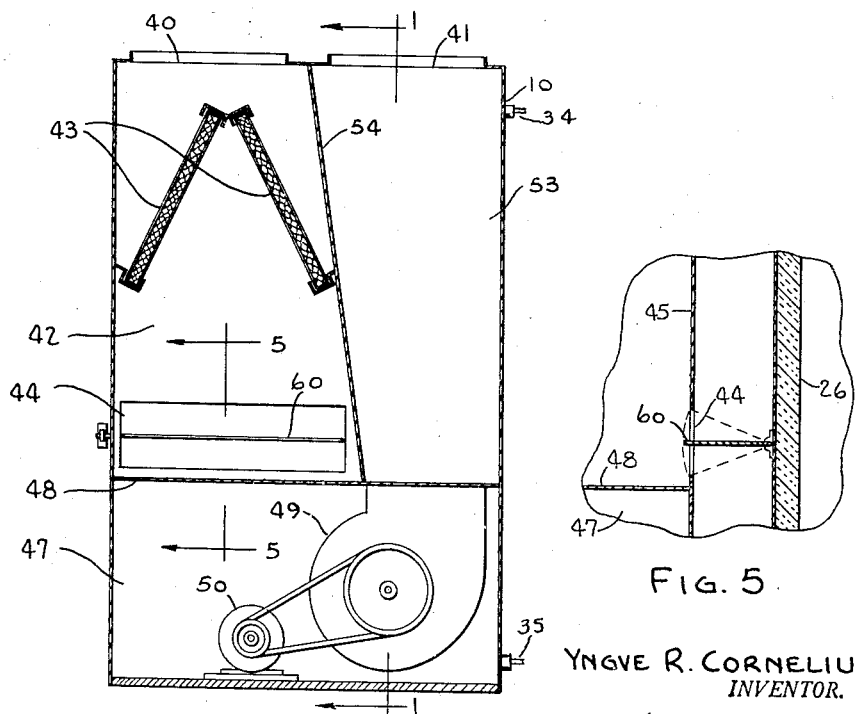

Patented Jan. 11, 1949

2,458,835

UNITED STATES PATENT OFFICE 2,458,835

HEATING APPARATUS

Yngve R. Cornelius, Seattle, Wash., assignor to Accuheat Electric, Portland, Oreg., a corporation of Oregon Application May 29, 1945, Serial No. 596,532

8 Claims. (Cl. 219—39)

The present invention relates to heating apparatus and more particularly to furnaces of the heat accumulator type.

For the heating of spaces such as of dwellings by means of electricity it is desirable to provide a heating apparatus incorporating an accumulator within which heat may be stored during off-peak power periods and which stored heat may be utilized during periods of peak power load conditions when the heating plant may be disconnected from the power system.

Heretofore, heating of homes electrically has been carried on mostly by so-called space heaters, having a heating element consisting of a coil of Nichrome or other suitable resistance wire. Sometimes these space heaters are equipped with a motor driven fan to accelerate the distribution of the generated heat. Such heating systems have many drawbacks, which makes them unsuitable for general use in heating of dwellings. A home is generally cool in the early morning and quick heating of the dwelling is then demanded. By thorough investigation I have found that the time required to heat the home in the morning should not exceed 20 minutes and to generate sufficient heat in such limited time would reqiure a heating capacity of 30 to 40 kw. depending on the size of the dwelling. A space heater ordinarily has a capacity of 1.25 kw. and such quick boosting of the house temperature would therefore require about 24 to 32 such heaters. Besides being both expensive and elaborate such installation would draw, a prohibitive amount of electric power at a time when the electric utility is supplying its maximum power to serve the morning "cooking load."

By experimentation I have found that the same dwelling referred to above may be heated adequately by only 8 kw., equivalent to 6 space heaters, when done according to my invention described herein. The heating apparatus of the present invention may be successfully operated alternately with the cooking range which has the advantages, that it will neither require the electric utility to increase the service to the dwelling nor cause additional demand during the cooking peaks. It is well known that electric power is relatively cheap in production cost and the consumers are primarily charged for the capital investment of the generating plant, and, above all, for the transmission of the electric power. The invention described hereunder utilizes electric power without increasing the demand on the utility or its distribution system. In other words, it is a load builder within the existing demand limits.

Most electric heaters operate with a resistance element of such small surface area that the latter heats up to the rather high temperature of 1200–1400° F. This results in several disadvantages, such as, scorching of organic dust particles in the air passing through the heater causing odor, intensive heat close to the unit, while other parts of the room may remain cool, and the high temperature may in many cases reduce the life of the element itself. By construction of several units according to the present invention I have found it to be extremely important to provide the resistance element with a large surface area. Several heating furnaces according to this invention have been constructed having a surface area of the resistor of ½ square inch per watt of electrical output. This has the advantage of a very slow heat transfer from resistor to the accumulator medium and from the latter to the air to be heated. The temperature of either a resistor or the accumulator rarely exceeds 600° F., while the air to be heated hardly exceeds half that temperature. No scorched odor will develop in the air going through the furnace and the atmosphere in the rooms maintains a uniform temperature. It was found that best results were obtained when the surface area of the heating element was at least 10% of the floor area to be heated, or 2,000 square inches per kw.

It is a primary object of the present invention to provide a heating apparatus comprising a relatively simple, low cost heat accumulator within which heat may be stored through dissipation of electrical energy during off-peak load periods, such as during the night and early morning hours, and which heat may be utilized as required during other periods of the day when the heating apparatus is disconnected from the power system. Such heating apparatus as has been designed heretofore for utilization of off-peak electrical energy have had certain disadvantages such as high initial cost, high maintenance cost or low efficiency. It is a further object of the present invention to overcome these defects and disadvantages of the prior art structures.

A further object of the invention is to provide a new and improved heating apparatus of the type described in which the heat accumulator serves also as the heat exchanger for effecting heating of the air utilized in heating the space.

A still further object of the invention is to provide a new and improved heating apparatus of the circulating air type from which the air may be delivered at a substantially constant temperature, irrespective of the temperature of the accumulator.

A still further object of the invention is to provide a new and improved electric resistance heating element arrangement in an accumulator type furnace structure.

In accordance with the illustrated embodiment, the heating apparatus of the present invention comprises an accumulator element consisting of a stack of bricks arranged in a plurality of substantially horizontal layers supported one above the other in a spaced relation by spaced rows of bricks provided therebetween so as to define an elongated circuitous air passage therethrough. An electric heating resistance element is arranged within the air passages in the stack of bricks and which are adapted to be connected across a source of power supply for effecting heating of the bricks such as during off-peak power periods. A blower means is provided for causing air to be circulated through the passages in the stack of bricks to effect heating thereof to the required extent.

These and further objects of the invention will be pointed out in the following description taken in connection with the accompanying drawings while the features of novelty will be set forth with greater particularity in the appended claims.

Figure 2:
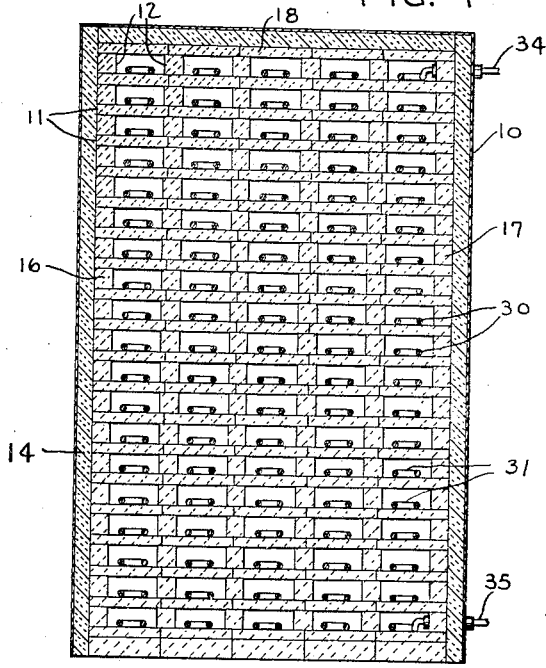

In the drawings Fig. 1 is a cross-sectional view in elevation illustrating the furnace structure constructed in accordance with one modification of the present invention; Fig. 2 is a cross-sectional view taken along the line 2—2 of Fig. 1; Fig. 3 is a sectional view taken along the line 3—3 of Fig. 1; Fig. 4 is a view taken along the line 4—4 of Fig. 1; and Fig. 5 is a fragmentary sectional view taken along the line 5—5 of Fig. 4.

Referring now to the drawings, the heating apparatus shown comprises an enclosure housing 10 which is of a generally rectangular shape and within which is provided a heat accumulator or heat storage unit comprising a stack of bricks shown at the left in Fig. 1 and in the sectional views of Figs. 2 and 3. The bricks are arranged in a plurality of superposed layers 11 which are spaced from each other by intermediate rows of bricks 12. With the exception of barrier extensions of certain of the layers 11 they are all of the same size that is, having aligned forward and rear edges and all of the layers extend the full width of the stack as shown in Fig. 2. The enclosure housing portion surrounding the stack of bricks is provided with a relatively thick wall 14 of suitable insulating material extending across the top, rear, and opposite sides. A solid vertical wall 15 of bricks is arranged at the rear of the stack next adjacent the rear insulated wall and as shown in Fig. 2, the outermost rows of spacer bricks 12 between the superposed layers 11 define the opposite side walls 16 and 17 of the stack while the uppermost horizontal layer of bricks defines the top 18 of the stack. The spaced horizontal layers 11 define air passages through the stack and with the provision of barrier extensions on certain of the layers, to be more fully described, a continuous circuitous passage of a generally zig zag nature is formed extending from the top of the stack to the bottom thereof.

The entrance to the air passage through the stack of bricks is indicated at 20 at the top of the stack and which is of the full width of the stack and above the upper barrier layer 21. The rear edges of the horizontal layers 11 are spaced from the rear wall 15 of the stack so as to provide an interconnecting passageway 23 for the spaces between the various horizontal layers around the rear end of the barrier layer 21. The central horizontal layer is provided with a rearward extension 22 providing a barrier across the rear passage so that air flowing through the entrance and into the rear passage 23 can flow downwardly only as far as the barrier 22 which will cause the air current to reverse direction and flow through the spaces between the horizontal layers toward the front of the stack and around the forward edge of the barrier layer 22. Spaced intermediate the barrier layer 22 and the bottom of the stack is a further barrier layer 25 similar to the barrier layer 21, the barrier layers 21 and 25 being bridged by an insulating wall 26 spaced forwardly from the forward edges of the horizontal layers so as to define a vertical passage 27 interconnecting the forward ends of the spaces between the horizontal layers arranged between the barrier layers 21 and 25. The rear edge of the barrier layer 25 is spaced from the rear wall 15 of the stack the same distance as the rear edge of the remaining horizontal layers so that the air may pass therearound and flow outwardly through the exit indicated at 28.

An electric resistance heating element 30 is provided in the brick stack for effecting the heating thereof and which, for convenience and ease of assembly is arranged within the spaces defining the air passages therein. The electric heating resistance element is made up of a plurality of bare iron rods 31 bent into a U-shape and placed directly upon the upper surface of each of the layers in the spaces between the rows 12 of spacer bricks as shown more clearly in Fig. 3. The iron rods of each layer are connected together at their opposite ends in a series relation whereas the ends of the rods of the different layers are all connected in further series relation with terminals brought out as indicated at 34 and 35 in Fig. 2 for connection to a suitable source of supply. The total length of the iron rod making up the resistance element, and the diameter thereof may be selected as desired. It has been found that ⅜ inch round mild steel rod has been suitable for this purpose and which is advantageous for various reasons including ready availability at low cost and substantial indestructibility. The rod may be bent on the job with ordinary tools and the ends welded together after assembly into the stack or it may be pre-formed.

With the resistance element being formed by a relatively large diameter iron rod having a correspondingly large surface area a relatively slow rate of heat transfer to the accumulator is effected. Moreover, the temperature of the rod will be kept relatively low, that is, generally below 600° F. so that it will have no destructive effect upon the metal. Moreover, such low temperature of the resistance element is important in that no scorching of organic dust particles can occur which might impart an odor to the air circulated through the passages of the accumulator. Also the maximum temperature which may be reached by the accumulator is thus definitely limited to a relatively low value minimizing heat insulation requirements. While it is not intended that the present invention be necessarily so limited it has been found that the diameter and length of the resistor should be such that it provides a surface area of about ½ square inch per watt of electrical power consumption. Based upon the heating requirements for an average dwelling, it has been found that the surface area of the resistor element should be of the order of 10% of the floor area to be heated, or about 2,000 square inches per kw. of electrical power requirements.

The forward upper wall of the housing 10 is provided with an inlet 40 and an outlet 41 for air. The inlet 40 communicates with chamber 42 across which is arranged a number of filter units 43 for filtering the air drawn into the furnace. In the lower end of the chamber 42 is a transverse opening 44 communicating with the space behind the wall 45 defining the rear of the chamber 42 and which is spaced forwardly of the heat accumulator unit.

Arranged in a compartment 47 beneath the transverse wall 48 defining the bottom of the chamber 42 is a blower 49 adapted to be driven by motor 50. The entrance to the blower 49 and indicated at 51 is directly in front of the exit 28 of the air passage through the brick stack. The blower discharges into the chamber 53 separated from the chamber 42 by the intervening wall 54 and which leads to the outlet 41.

Arranged behind the opening 44 at the lower end of the compartment 42 is a damper 60 which is adapted to control the relative proportions of the total quantity of air flow drawn through the inlet and which are permitted to flow, respectively, through the air passage in the accumulator stack and to be by-passed directly to the entrance of the blower 49. As shown more clearly in the view of Fig. 5 the damper 60 is pivotally mounted upon the forward insulating wall 26 and is preferably of the balanced type and operable between the upper and lower limit positions indicated by dotted lines. A short vertical end wall 61 is arranged adjacent the end of the damper 60 and a horizontal wall 62 extends from wall 61 to opposite side of the furnace. In the upper limit position the air passage leading upwardly between the wall 45 and the insulating wall 26 to the entrance 20 of the air passage to the brick stack is closed and all of the air drawn through the inlet 40 and through the opening 44 is by-passed downwardly to the entrance of the blower 49 with none circulating through the accumulator stack. On the other hand, with the damper 60 in the lower limit position the by-pass is closed and all of the air is directed upwardly toward the passage entrance 20 from whence it flows through the accumulator stack out through the passage exit 28 into the blower and upwardly through the outlet 41.

The blower 49 is adapted to be continuously driven for effecting continuous circulation of air through the space to be heated or air-conditioned while the damper 60 is adapted to be controlled by a modulating type of control motor through a thermostat means arranged in the room whereby the position of the damper 60 is variably controlled in accordance with the heat requirements of the room. If more heat is required by the room the damper 60 will be shifted to a lowered position to circulate more air through the accumulator stack and if less heat is required the damper 60 is shifted to an upper position to restrict the amount of air circulated through the accumulator. In this manner the amount of heat extracted from the accumulator can be controlled directly in accordance with the demand for heat and in such a manner that the temperature of the air discharged from the furnace is substantially constant and irrespective of the temperature of the brick stack.

In the following claims the heat accumulator unit as herein described is referred to as comprising a stack of "bricks." It is to be understood that this particular term is employed for purposes of convenience only and it is intended thereby to refer to and include not only bricks such as refractory blocks but any other shaped pieces of non-metallic, inorganic material having similar properties and which may constitute an equivalent of bricks in a heat accumulator structure as herein described.

Having described the invention in what is considered to be a preferred embodiment thereof, it is desired that it be understood that the specific details shown are merely illustrative and that the invention may be carried out by other means.

What I claim is:

1. In an electric heating apparatus the combination comprising a heat accumulator means including a plurality of horizontal layers of bricks supported in a vertically spaced relation, a resistance element consisting of a plurality of lengths of bare iron rod connected together at opposite ends in series relation resting upon each of said layers, the resistance elements on said different layers being connected together in series relation, means for connecting said resistance elements to a source of electric energy, the resistance of said element being such that the maximum temperature thereof is limited to substantially 600° F., an insulated enclosure housing for said heat accumulator means, means for circulating air between said layers for heating the same.

2. In an electric heating apparatus the combination comprising a plurality of substantially horizontal layers of bricks, said layers being supported above one another in a spaced relation, a resistance element consisting of a plurality of lengths of bare iron rod of a length corresponding substantially to the length of said layers of brick, said rods being connected together at opposite ends in a series relation and resting upon corresponding layers of brick, the resistance elements on each of said layers being connected together in a series relation, means for connecting said resistance elements to a source of electric energy, the resistance of said element being such that the maximum temperature thereof is limited to substantially 600° F., an enclosure housing for said layers of brick, said enclosure housing being spaced from the opposite ends of said layers defining spaces communicating with the open spaces between said layers at the opposite ends thereof, means for circulating air through said spaces and between said layers for effecting heating of said air.

3. In an electric heating apparatus the combination comprising a plurality of substantially horizontal layers of brick, said layers being supported one above the other in a spaced relation, a resistance element positioned upon each of said layers consisting of a plurality of bare iron rods of a length corresponding substantially to the length of each of said layers, said rods being connected together at opposite ends in a series relation, the resistance elements on each of said layers being connected together in a series relation, means for connecting said resistance elements to a source of electric energy, said resistance element having a surface area of at least ½ sq. in. per watt of electrical output, an enclosure housing surrounding all of said layers of brick and being spaced therefrom at the front and rear defining air passages, means including extensions of certain of said layers defining barriers across said passages at both the front and rear sides of said layers of brick to form a continuous circuitous passage for air between said layers from top to bottom, and means for forcing air through said circuitous passage for effecting heating thereof.

4. In a heating apparatus, the combination comprising a stack of bricks defining a heat accumulator, said stack of bricks being so arranged as to define an elongated circuitous air passage through said stack, an insulated enclosure for said stack, an inlet and an outlet for air extending through a wall of said enclosure and communicating respectively with the opposite ends of said passage, a coil of bare iron rod arranged in said passage and resting upon said bricks, means for connecting the opposite ends of said rod across a source of electric energy, blower means within said enclosure for effecting circulation of air through said passage, and means arranged between said inlet and said outlet for controlling the relative proportion of air permitted to flow through said passage the resistance of said rod being such that the maximum temperature thereof is limited to substantially 600° F.

5. In a heating apparatus, the combination comprising a stack of bricks defining a heat accumulator, said stack of bricks comprising a plurality of substantially horizontal layers supported one above the other in a spaced relation, a rectangular enclosure for said stack, electric heating resistance elements supported upon a plurality of said layers for effecting heating of said stack, the spaces between adjacent layers defining an air passage through said stack, a first vertical wall adjacent said stack having an inlet opening in the upper end and an outlet opening in the lower end communicating with opposite ends of said passage, a second vertical wall parallel with said first wall and spaced outwardly therefrom, an elongated horizontal opening through said second wall between said inlet and said outlet for said passage, a filter chamber within said enclosure communicating with said rectangular opening, a blower compartment within said enclosure below said filter chamber, an intake opening for said blower through said second wall below said rectangular opening, and damper means mounted on said first wall opposite said rectangular opening for controlling the flow of air from said filter chamber to said stack passage.

6. In a heating apparatus, the combination comprising a stack of bricks defining a heat accumulator, said stack of bricks comprising a plurality of horizontal layers supported one above the other in a spaced relation, an insulated enclosure for said stack, electric heating resistance elements supported upon a plurality of said layers for effecting heating of the bricks of said stack, the spaces between adjacent layers defining an air passage through said stack, the inlet to said air passage being at the upper end of said stack and the outlet of said passage being at the lower end of said stack, a first vertical wall extending across the front of said stack between the inlet and outlet of said passage, a second vertical wall parallel with said first wall and spaced therefrom, an upper inlet opening and a lower outlet opening through said second wall, a damper pivotally mounted upon said first wall behind said inlet opening in said second wall, said damper being adjustable for controlling the proportion of the total amount of air passing through said inlet opening in said second wall which is allowed to pass through said circuitous passage in said stack.

7. In a heating apparatus, the combination comprising a stack of bricks defining a heat accumulator, said stack of bricks comprising a plurality of substantially horizontal layers supported one upon the other in a spaced relation, an enclosure for said stack, electric heating resistance elements supported upon a plurality of said layers for effecting heating of the bricks of said stack, the spaces between adjacent layers defining a circuitous air passage through said stack, a first vertical wall extending adjacent the forward side of said stack, an inlet opening in the top of said first wall and an outlet opening in the bottom of said first wall communicating with the opposite ends of said circuitous passage, a second vertical wall parallel with and spaced outwardly from said first wall, a horizontal elongated rectangular air inlet opening in said second wall and an air outlet opening in said second wall below said last mentioned air inlet opening, a horizontally pivoted elongated damper mounted upon said first wall centrally aligned with said rectangular opening in said second wall, the free end of said damper extending through said rectangular opening and being adjustable for controlling the amount of air flowing through said rectangular opening which is permitted to flow through said circuitous passage of said stack.

8. In a heating apparatus, the combination comprising a stack of bricks defining a heat accumulator, said stack of bricks comprising a plurality of substantially horizontal layers supported one above the other in a spaced relation, an insulated enclosure for said stack, electric heating resistance elements supported upon a plurality of said layers for effecting heating of said stack, said spaces defining a circuitous air passage through said stack, the inlet for said passage being adjacent the upper end of said stack, the outlet for said passage being adjacent the lower end of said stack, said inlet and said outlet being on one side of said stack, a vertical wall spaced from said one side of said stack, an air intake opening through said wall between said inlet and outlet of said passage, and a damper adjustably mounted adjacent said intake opening for controlling the flow of air from said intake opening to said passage inlet.

YNGVE R. CORNELIUS.

REFERENCES CITED

The following references are of record in the file of this patent:

UNITED STATES PATENTS

| Number | Name | Date |
| --- | --- | --- |
| 1,995,673 | Evans | Mar. 26, 1935 |
| 2,367,170 | Fahrenwald | Jan. 9, 1945 |

OTHER REFERENCES

Dana et al.: "Engineering Bulletin No. 46," State College of Washington, Pullman, Wash.